United States Patent [19]

Peachee et al.

[11] Patent Number: 4,492,888
[45] Date of Patent: Jan. 8, 1985

[54] WIRE WAY SECUREMENT MEANS FOR DYNAMOELECTRIC MACHINE

[75] Inventors: C. Theodore Peachee; Daniel R. Messner, both of St. Louis County, Mo.

[73] Assignee: Emerson Electric Co., St. Louis, Mo.

[21] Appl. No.: 457,164

[22] Filed: Jan. 11, 1983

[51] Int. Cl.$^3$ ............................................. H02K 11/00
[52] U.S. Cl. ...................................... 310/71; 310/89; 174/65 R
[58] Field of Search ................... 310/68 R, 71, 89, 90; 339/107, 128; 174/65 R

[56] References Cited
U.S. PATENT DOCUMENTS 3,772,453  11/1973  O'Brien ............................ 310/716
3,976,965   8/1976  Remus .............................. 310/71 X
4,358,079  11/1982  Navarro ........................ 174/65 R X
4,429,243   1/1984  Crow ................................... 310/71

Primary Examiner—Donovan F. Duggan
Attorney, Agent, or Firm—Polster, Polster and Lucchesi

[57] ABSTRACT

This invention relates to a dynamoelectric machine having a stator and rotor with the latter including a hollow shaft extending from the body of the rotor and with the rotor shaft being journalled by bearings carried by the end shields or bearings supports of the dynamoelectric machine. A tubular wire way extends through the hollow rotor shaft and is stationarily secured to the stator. Specifically, an opening is provided in one of the end shields for threadably receiving the wire way and the end of this wire way protrudes beyond the one end shield. A locking nut is threadably received on the end of the wire way protruding beyond the end shield so as to lock the wire way with respect to the end shield.

3 Claims, 11 Drawing Figures

WIRE WAY SECUREMENT MEANS FOR DYNAMOELECTRIC MACHINE

BACKGROUND OF THE INVENTION

This invention relates to a dynamoelectric machine and more particularly to a fractional horsepower induction motor such as may be utilized with an overhead ceiling fan.

Overhead ceiling fan motors are oftentimes multi-pole motors, for example, an 18 pole permanent split capacitor (PSC) motor, which have a relatively slow synchronous speed (e.g., 400 rpm). These motors typically include a stator assembly having a core made of a stack of laminations of suitable ferromagnetic material having a central bore therethrough and having radial slots extending outwardly from the bore for receiving a multiplicity of coils of magnet wire so as to constitute the windings of the motor. A rotor is positioned within the bore of the core of the stator assembly and the rotor includes a hollow rotor shaft extending endwise from the rotor body. The stator further includes end shields or bearing supports carrying suitable bearings, for example ball bearings, which receive and journal the rotor shaft such that the rotor is free to rotate within the bore of the stator. Typically, an overhead ceiling fan motor is suspended from a support pipe which is attached to a suitable structure on the ceiling. The fan blades for the overhead ceiling fan are attached to a hub secured to the end of the rotor shaft which extends down below the motor such that the hub and the blades rotate with the rotor shaft.

Oftentimes a switch housing is provided below the fan blade hub which encloses a control switch for controlling operation of the motor (i.e., energization, de-energization, and speed control of the motor). Additionally, the switch housing may be provided so as to support a lighting fixture in a combination overhead ceiling fan/lighting fixture appliance. With the switch housing located stationarily below the rotating fan blade hub, it is conventional to provide a hollow, stationary wire way extending through the rotor shaft and to provide a passageway for electrical lead wires between the windings of the motor, the speed control and on/off switch located in the switch housing, the light fixture carried by the switch housing, and the source of electrical power which is typically located on the ceiling of the building.

Heretofore, as shown in FIG. 10 of the present drawings, it was conventional in prior art overhead ceiling fans to securely locate the wire way relative to the upper end shield of the motor by means of a locknut located within a hollow hub formed on the end shield. Then, a flanged cap was removably secured to the hub formed on the end shield by a plurality of screws with this flanged hub having a receptacle for threadably receiving the pipe support suspending the overhead ceiling fan from the overhead ceiling structure. However, as shown in FIG. 10, this construction required a multiplicity of additional parts to be attached to the motor and required additional steps in the manufacture of the motor. Still further, such a structure required a considerable increase in materials, costs, and overall length (or height) of the motor for the overhead ceiling fan. It will be appreciated in many applications for overhead ceiling fans in modern day residential dwelling units with 8 foot ceilings, even small increases in the overall length of the overhead ceiling fan is a substantial disadvantage.

In another type of prior art overhead ceiling fan, as illustrated in FIG. 11, a housing structure ws rigidly attached to the stator assembly of the motor so as to extend above the motor and to provide a support for a hub into which the support pipe for the motor is threadably secured. The wire way was fixedly secured relative to the end shields of the motor by press fitting a cup-shaped member into a receptacle formed in the end shield of the motor so as to stationarily affix the wire way relative to the end shield. This arrangement, as shown in FIG. 11, added appreciably to the overall length of the overhead ceiling fan motor, required additional parts, and was expensive to manufacture and assemble.

SUMMARY OF THE INVENTION

Among the several objects and features of the present invention may be noted the provision of a dynamoelectric machine such as described above, particularly adapted for use in an overhead ceiling fan application, which eliminates the necessity of additional parts to be attached to the end shield of the dynamoelectric machine for attachment of the wire way and for attachment of the overhead support pipe;

The provision of such a dynamoelectric machine which permits the minimum length of electric lead wires to be provided for connecting the windings and control switch of the dynamoelectric machine to the source of electrical power;

The provision of such a dynamoelectric machine in which the overall length or height of the motor is minimized;

The provision of such a dynamoelectric machine in which the materials utilized to form the end shield and support pipe securement member is minimized; and The provision of such a dynamoelectric machine which is of economical construction, which is relatively easy to assemble, and which requires no field assembly.

Other objects and features will be in part apparent and in part pointed out hereinafter.

Briefly stated, this invention relates to a dynamoelectric machine having a stator assembly including a core, the core having a bore extending longitudinally therethrough. The stator assembly further includes a bearing support or end shield carried by the core. Still further, the dynamoelectric machine includes a rotor assembly having a rotor body rotatable within the bore of the stator core. A shaft extends from the rotor body, this shaft being hollow and being journalled by bearings carried by the bearing support. A wire way extends through the hollow rotor shaft and is stationarily secured relative to the stator assembly. Specifically, the improvement of this invention comprises an opening within the bearing support for threadably receiving the wire way. An end of the wire way protrudes beyond the bearing support and a locking nut is threadably received on the end of the wire way protruding beyond the bearing support thereby to lock the wire way with respect to the bearing support.

More specifically, the bearing support has a hub integral thereon generally coaxial with respect to the wire way and the wire way opening with the hub having a blind opening therein facinhg away from the rotor, this blind opening being substantially coaxial with the opening threadably receiving the wire way. Further, this blind opening is of only slightly larger diameter than the diameter of the locking nut securing the wire way relative to the bearing support. The locking nut has means in its outer end for engagement by a tool for tightening the locking nut on the wire way and on the base of the blind opening surrounding the opening on the bearing support which threadably receives the wire way.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
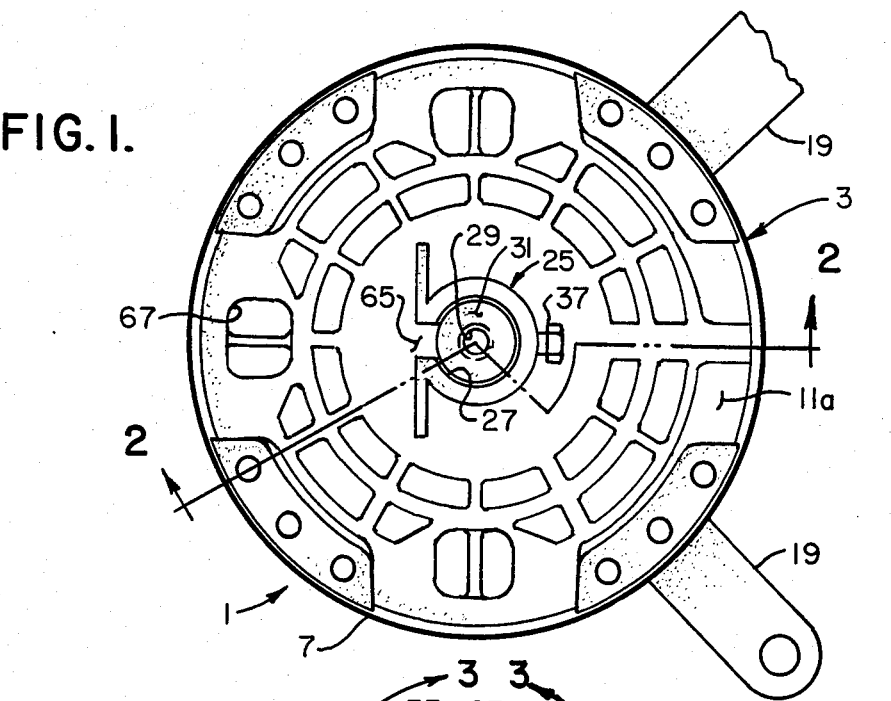
FIG. 1 is a top plan view of a dynamoelectric machine of the present invention, and more particularly illustrates the upper end of an induction motor adapted for application with an overhead ceiling fan.

Referring now to the drawings, a dynamoelectric machine of the present invention is indicated in its entirety by reference character 1. More specifically, the dynamoelectric machine is shown to be an induction motor particularly adapted for use with an overhead ceiling fan. For example, a typical overhead ceiling fan motor may be an 18 pole permanent split capacitor (PSC) motor. The motor typically includes a stator assembly, as generally indicated at 3, and a rotor assembly 5. The stator assembly includes a shell 7 enclosing the stator assembly and a core 9 comprised of a stack of plate-like laminations of suitable ferromagnetic material. As is conventional, the core has a central bore B extending longitudinally therethrough and a plurality of notches or slots (not shown) extending generally radially outwardly from bore B for receiving a plurality of coils of magnet wire to constitute the windings W (shown in phantom in FIG. 2) of the motor. The stator assembly further includes a plurality of bearing supports or end shields at each end of the stator assembly, as indicated by references characters 11a, 11b. Typically, the end shields are fixedly secured in place on the shell 7 by means of through bolts 12 extending through the motor.

Figure 2:
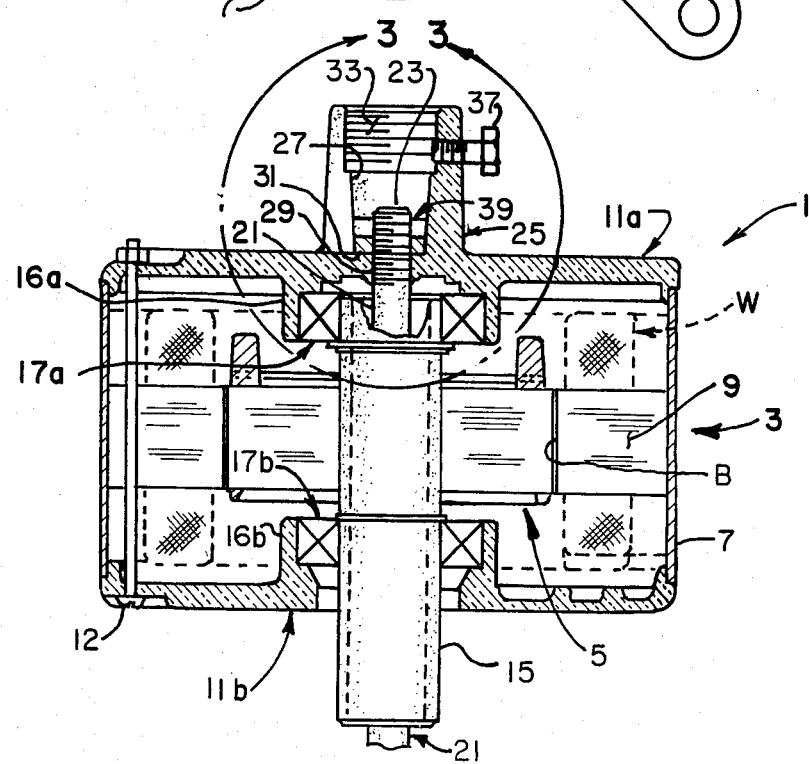
FIG. 2 is a longitudinal cross section of the dynamoelectric machine taken along line 2—2 of FIG. 16 illustrating means for locking a wireway with respect to the end shield in accordance with the present invention.

As shown in FIG. 2, rotor assembly 5 includes a rotor body 13, the rotor body being of squirrel-cage construction. A hollow rotor shaft 15 is fixedly secured to the rotor body and the rotor body and the rotor shaft are rotatable together. Each of the end shields 11a, 11b is provided with a respective bearing hub 16a, 16b which receives respective bearings, preferably ball bearings, as indicated at 17a, 17b, which receive and journal rotor shaft 15 thereby to accurately locate and to maintain rotor body 13 centered within bore B of stator core 9. As shown in FIG. 1, a plurality of mounting brackets 19 are rigidly affixed to shell 7 of the stator assembly and these mounting brackets may support an outer decorative shell (not shown) for the overhead ceiling fan.

As best shown in FIG. 2, a hollow wire way tube, as indicated at 21, is coaxial within hollow rotor shaft 15. Wire way tube 21 has threads 23 at its upper end. End shield 11a is provided with a hub 25 integrally die cast with the end shield. The hub has a blind opening 27 therein which faces outwardly away from the motor and is generally coaxial with the longitudinal centerline of rotor shaft 15 and with wire way 21. A so-called wire way opening 29 is provided in the base 31 of opening 27 and the wire way opening 29 is threaded so as to threadably receive threads 23 on wire way tube 21. As further shown in FIG. 2, the upper end of opening 27 is threaded, as indicated at 33, so as to receive a support pipe 35 (see FIG. 4). A set screw 37 is threadably received in the upper end of hub 25 so when tightened to securely affix the support pipe 35 relative to the hub and to prevent rotation of the motor relative to the support pipe.

In accordance with this invention, a locking nut, as generally indicated at 39, is threadably received on the upper portion of wire way tube 21 (see FIG. 2) so as to securely affix or lock the wire way relative to end shield 11a. More specifically, locking nut 39 engages and bears against base 31 of blind opening 27 so as to positively prevent rotation of wire way tube 21 relative to the end shield.

Figure 6:
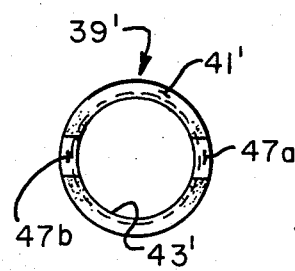
FIG. 6 is a top plan view of a first embodiment of a locking nut for securing the wire way in place on the bearing support.
Figure 7:
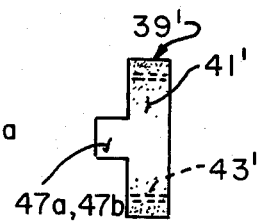
FIG. 7 is a right side elevational view of the locking nut shown in FIG. 6.
Figure 8:
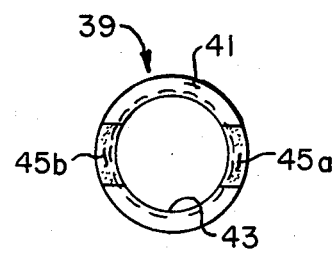
FIG. 8 is a top plan view of another embodiment of the locking nut of the present invention, this embodiment being shown in FIGS. 3 and 4.
Figure 9:
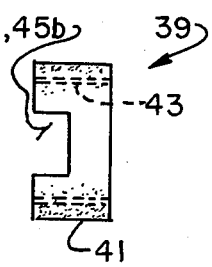
FIG. 9 is a right side elevation view of the locking nut shown in FIG. 8.

Referring now to FIGS. 8 and 9, wire way nut 39 is shown to include a nut body 41 having a threaded opening 43 extending therethrough and being adapted to be threadably received on threads 23 of wire way tube 21. Opposed openings 45a, 45b are provided on the upper end face of nut body 41. An alternative embodiment for locking nut is shown in FIGS. 6 and 7 with the "primed" reference characters indicating parts corresponding in construction and in function to the parts heretofore described in regard to locking nut 39 illustrated in FIGS. 8 and 9. However, in place of the opposed openings 45a, 45b of locking nut 39, locking nut 39' includes a pair of opposed lugs 47a, 47b on opposite sides of the nut and as are best shown in FIG. 7. It will be understood that lugs 45a, 45b and openings 47a, 47b are provided for the purpose of allowing an insertion tool, as will be hereinafter described, to positively engage nut 39 or 39' and to tightly secure the locking nut relative to base 31 of end shield 11a thereby to fixably lock wire way tube 21 relative to the end shield.

Figure 3:
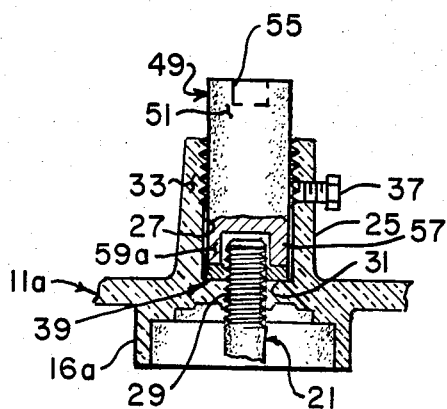
FIG. 3 is a partial view taken along line 3—3 of FIG. 2 on a somewhat reduced scale illustrating the threadable installation and securement of the wire way with respect to the bearing support (or end shield) by means of a tool insertable into a blind opening in the integral hub formed on the bearing support.
Figure 4:
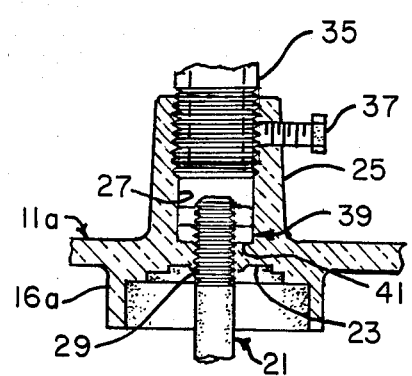
FIG. 4 is a view similar to FIG. 3 showing the wire way fixably secured in place and further illustrating a pipe support threadably engaging the blind opening in the hub which is securely affixed in place by means of a set screw.

Upon assembling of the motor generally as shown in FIG. 2, wire way tube 21 is inserted longitudinally through hollow rotor shaft 15 from the bottom of the motor and the upper end of the wire way tube is threaded into threaded opening 29 in end shield 11a such that the upper end of the wire way tube extends above the base 31 of blind opening 27 in hub 25 a distance generally similar to that shown in FIGS. 2–4. Then, a locking nut 39 or 39' is inserted down into blind opening 27 and is threadably engaged on the threads 23 provided on the upper end of wire way tube 21. A tool, as indicated generally at 49, is inserted into blind opening 27 in hub 25 so as to engage the upper end face of locking nut body 41 and so as to permit the locking nut to be forceably, threadably driven into firm locking engagement with wire way tube 21 and with the base 31 of end shield 11a.

Figure 5:
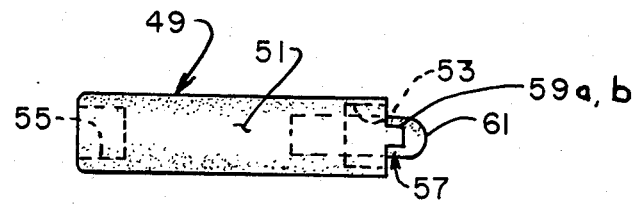
FIG. 5 is a side elevational view of the tool illustrated in FIG. 3 for fixably securing the locking nut on the wire way.

More specifically, as shown in FIG. 5, locking nut installation tool 49 comprises a tool body 51 of generally cylindrical construction having a diameter slightly less than the inside diameter of blind opening 27. Tool body 51 is provided with a counterbore in its lower end which is of somewhat larger diameter than the outer diameter of wire way tube 21 such that the upper end of the wire way comfortably fits within counterbore 53, as shown in FIG. 3. Additionally, means is provided on the lower end face of tool body 51 for engagement with either lugs 47a, 47b or with opposed openings 45a, 45b of locking nuts 39' or 39, respectively, so as to permit the locking nut to be forceably driven by tool 49. As shown in FIGS. 3 and 5, locking nut 39 having slots 45a, 45b therein is utilized to affix wire way tube 21 relative to end shield 11a. Accordingly, the driving means on tool 41 is shown to comprise a pair of opposed lugs 59a, 59b which fit within and which engage opposed slots 45a, 45b on locking nut body 41'. Further, tool 49 includes a socket opening 55 in its end opposite counterbore 53 thereby to permit a driving tool (not shown) to engage and to forceably turn tool 49 thereby to torque locking nut 39 to a desired torque level and so as to positively fix wire way tube 21 relative to end shield 11a. It will be understood that if locking nut 39', as shown in FIG. 6 and 7, were used in place of locking nut 39 shown in FIGS. 8 and 9, tool 49 could be provided with respective slots in its end base for receiving lugs 47a, 47b in place of the protruding lugs 59a, 59b as heretofore described. As indicated at 61, an optional pilot pin may be provided in tool body 51 to extend outwardly beyond the end face of tool body 51 so as to be received within the hollow opening of wire way tube 21 thereby to align the driving tool relative to the wire way tube and to hold the driving tube in generally coaxial relationship with both locking nut 39 and with respect to the wire way tube. However, because of the relatively close tolerances between the outer cylindric surfaces of tool body 51 and blind opening 27 in hub 25, pilot pin 61 may be omitted from the tool in many applications.

Figure 11:
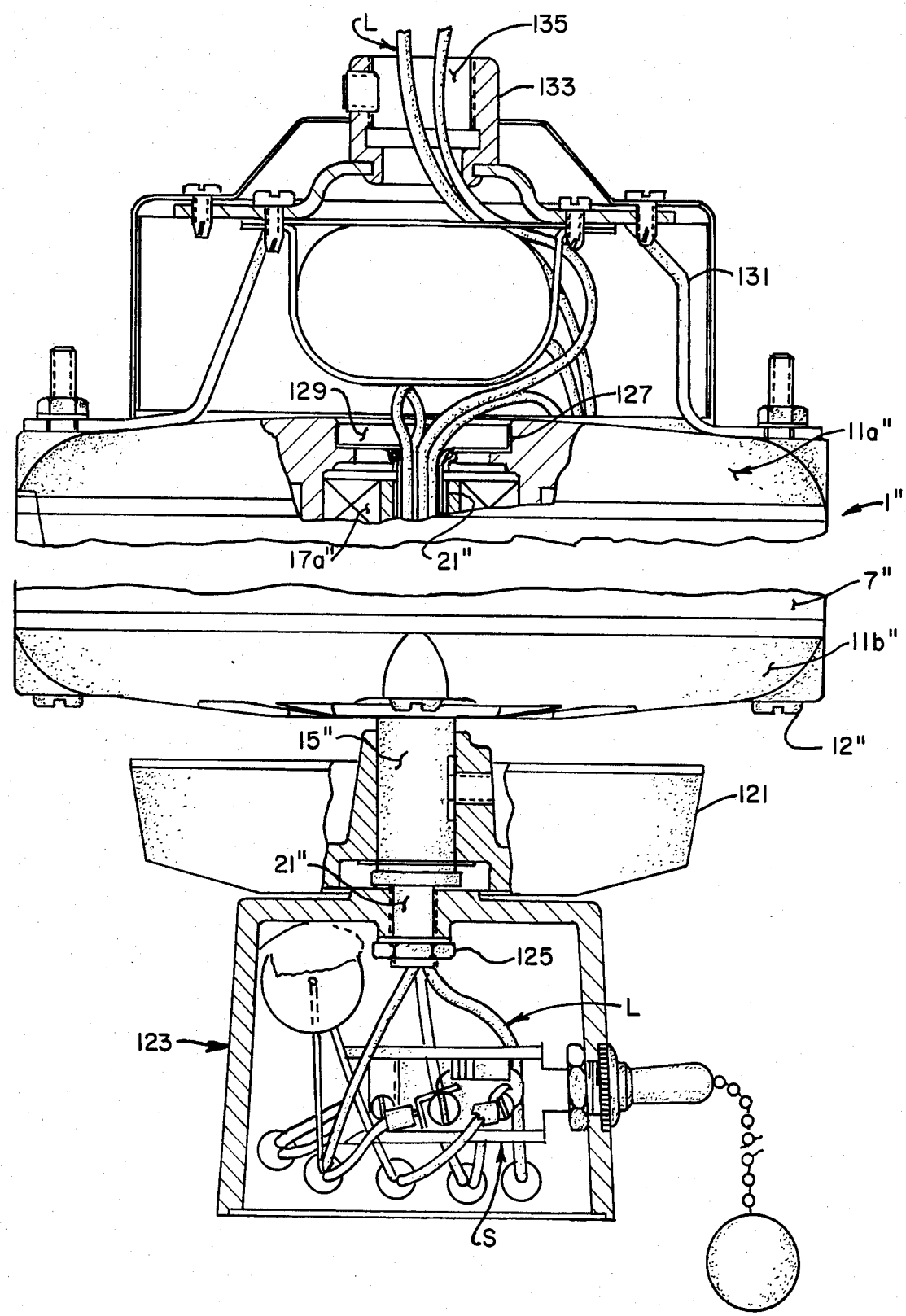
FIG. 11 is a vertical longitudinal cross-section of another prior art dynamoelectric machine for application with an overhead ceiling fan illustrating another manner of securing of a stationary wire way with respect to the end shield of the motor and further illustrating a fan blade hub assembly secured to and rotatable with the rotor shaft of the motor and further illustrating a switch housing stationarily secured to the wire way below the rotatable rotor shaft and fan blade hub assembly.

After insertion of wire way tube 21 and locking nut 39 or 39', as heretofore described, it will be appreciated that wire way tube 21 is fixably secured and is held stationary with respect to end shield 11a. Then, the various lead wires for the electric motor may be inserted into hollow wire way tube 21 so as to extend down to the switch housing carried by the lower end of the wire way tube (generally as shown in FIG. 11, as will be hereinafter explained). It will be further noted that hub 25 on end shield 11a is provided with a slot 63 at one side thereof so as to permit lead wires exiting end shield 11a from a lead wire opening 65 at one side of the end shield to enter the hub and to pass downwardly through the wire way 21 and likewise to permit lead wires from the wire way tube and from slot 65 to be inserted up through support pipe 35 after the support pipe has been screwed in place into opening 27 and has been securely affixed by means of set screw 37.

Figure 10:
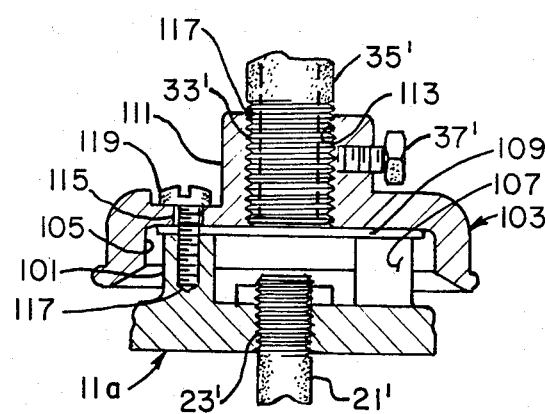
FIG. 10 is a partial vertical cross-sectional view of a prior art dynamoelectric machine illustrating a prior method of securing a wire way to the end shield of the dynamoelectric machine and further illustrating a prior manner of securing an overhead support pipe to the dynamoelectric machine.

Referring now to FIG. 10, a prior art system for securing a wire way tube to an end shield and for securing a pipe support for an overhead ceiling fan to the end shield is illustrated. It will be understood that the "primed" reference characters in FIG. 10 illustrate parts of the prior art motor construction having a similar construction and operation to the parts heretofore described in regard to FIGS. 1–4. As shown, the prior art end shield 11a' includes a circular flange 101 die cast-in-place with the end shield which extends axially outwardly beyond the end face of the end shield. A so-called mounting hub, as generally indicated at 103, includes a cup-shaped counterbore which fits over and extends downwardly around the outside of circular flange 101. The end faces 107 of flange 101 bear against a plate 109 provided between mounting hub 103 and flange 101. Mounting hub 103 further includes a central boss 111 which extends generally coaxially outwardly away from flange 101 and has an opening 113 therein for threadably receiving a pipe support 35'. Further, mounting hub 103 includes a plurality of openings 115 therearound generally in register with corresponding threaded openings 117 in flange 101 for receiving screws 119 which fixedly secure mounting hub on the end face of flange 101. It will be noted that this prior art arrangement requires the provision of a number of separate parts to secure the support pipe 35' to the end shield so as to be in generally coaxial relation with wire way tube 21' and further it will be noted that this wire way hub must be installed on the end shield by the person installing the overhead ceiling fan on the ceiling so as to insure that the various lead wires (not shown) extend axially through the pipe support 35'.

Referring now to FIG. 11, another embodiment of a prior art dynamoelectric machine for application with an overhead ceiling fan is shown. In FIG. 11, parts corresponding to the dynamoelectric machine of the present invention heretofore described are indicated by "double primed" reference characters and thus a detailed description of these "double primed" parts would be repetitive and, for the sake of brevity, is not herein repeated. In many dynamoelectric machine overhead ceiling fan applications, a so-called fan blade assembly hub 121 is fixably secured to rotor shaft 15" and is rotatable with the rotor shaft at a location below the lower end shield 11b". Further, it will be noted that wire way tube 21' extends coaxially through hollow rotor shaft 15" to a location below the lower end of the rotor shaft. A so-called switch housing 123 is secured to the lower end of wire way tube 21" by means of a nut 125. As is conventional, switch housing 123 may include a multi-position speed selector switch S for controlling operation of the motor. As indicated by reference character L, a plurality of lead wires extends axially through wire way tube 21" and are electrically connected to respective terminals on switch S. This is conventional in overhead ceiling fan applications and it will be understood that a similar fan blade hub and switch housing arrangement may be provided with the motor of the present invention, as shown in FIGS. 1 and 2.

However, in FIG. 11, it will be noted that wire way tube 21" is affixed to end shield 11a" in a manner significantly different from the apparatus and system of the present invention. More particularly, end shield 11a" is provided with an enlarged diameter counterbore 127 in its upper end face and wire way tube 21' has a cup-shaped member 129 swaged or otherwise fixably secured to the upper end of the wire way tube. This cup-shaped member is press fit into counterbore 127 and thus the pressed in place cup-shaped member 129 positively prevents rotation of wire way tube 21' relative to hollow rotor shaft 15'. However, the requirement of the counterbore 127 in end shield 11a" and the requirement of the cup-shaped member 129 fixably secured to wire way tube 21" is significantly more complex and costly than the method of securement of the present invention, as heretofore described in regard to FIGS. 1–9.

Further, in FIG. 11, it will be noted that a housing 131 is provided which is rigidly secured or bolted to the upper face of end shield 11a. This housing 131 extends a considerable distance above the end of wire way tube 21" and above the upper face of end shield 11a. A bushing 133 is secured in place to the upper end of housing 131 and this bushing or socket includes a threaded opening 135 for threadably receiving a pipe support (not shown in FIG. 11). Thus, it will be appreciated that the structure of the instant invention eliminates the necessity of housing 131 and bushing 135 and thus substantially reduces the overall length or height of the overhead ceiling fan motor 1".

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

We claim:

1. In a dynamoelectric machine having a stator assembly including a core, a bore within said core, and a bearing support carried by said core, said dynamoelectric machine further comprising a rotor assembly having a rotor body rotatable within said bore, a shaft extending from said rotor body, said shaft being hollow and being journalled by bearings carried by said bearing support, a wire way extending through said hollow rotor shaft and being stationarily secured with respect to said stator assembly, wherein the improvement comprises: an opening within said bearing support for threadably receiving said wire way, an end of said wire way protruding beyond said bearing support, a locking nut threadably received on the end of said wire way protruding beyond said bearing support thereby to lock said wire way with respect to said bearing support, said bearing support further having a hub thereon generally coaxial with said wire way opening, said hub having a blind opening therein facing away from said rotor, said blind opening being substantially coaxial with said opening receiving said wire way, said blind opening being of only slightly larger diameter than the diameter of said lock nut, the latter having means on its outer end for engagement by a tool for tightening said lock nut on said wire way and on the base of said blind opening within said hub surrounding said opening receiving said wire way.

2. In a dynamoelectric machine as set forth in claim 1 wherein said hub further had internal threads on the opening therewithin for threadably receiving a pipe support in generally close axial relation to the end of said wire way received within said hub.

3. In an electric motor for application with an overhead ceiling fan, said motor comprising a stator assembly including a core having a central bore therethrough, a plurality of bearing support members carried by said stator assembly, a rotor assembly including a rotor body, the latter generally disposed within and rotatable within said bore, said rotor body further including a hollow rotor shaft extending axially outwardly from said rotor body and being journalled by bearings carried by said bearing support member, a tubular wire way member received within said rotor shaft and being held stationary relative to said stator assembly, wherein the improvement comprises: a hub integrally formed on one of said bearing supports, said hub being generally coaxial with said rotor shaft, said hub having a bore therein and a base defining the inner end of said bore, said bearing support having an opening coaxial with said hub for threadably receiving said wire way tube, a locking nut insertable into said hub for threadably receiving said wire way, said locking nut being threadably engagable with the base of said hub bore so as to securely affix said wire way tube relative to said bearing support member, said hub having an opening in one side thereof so as to permit one or more lead wires from said motor to enter said hub and to be fed axially through said wire way, the outer end of said opening in said hub being threaded so as to threadably receive a pipe support with certain of said lead wires being axially insertable through said pipe support for connection to a source of electrical power.

* * * * *